Sept. 26, 1950        J. G. KIRKPATRICK        2,523,310

HYDRAULIC THRUST BEARING

Filed June 2, 1947        3 Sheets-Sheet 2

Inventor
John Graham Kirkpatrick

By *Clarence A. O'Brien and Harvey B. Jacobson*
Attorneys

Sept. 26, 1950     J. G. KIRKPATRICK     2,523,310
HYDRAULIC THRUST BEARING

Filed June 2, 1947     3 Sheets-Sheet 3

Inventor

John Graham Kirkpatrick

By *Clarence A. O'Brien and Harvey B. Jacobson*
Attorneys

Patented Sept. 26, 1950

2,523,310

UNITED STATES PATENT OFFICE 2,523,310

HYDRAULIC THRUST BEARING

John Graham Kirkpatrick, York, Nebr.

Application June 2, 1947, Serial No. 751,762

14 Claims. (Cl. 308—9)

This invention pertains to hydraulic thrust bearings and more specifically resides in a thrust bearing which has free-floating action upon its bearing surfaces by means of a hydraulic or other fluid medium interposed therebetween under pressure.

This invention has for its primary object the provision of a thrust bearing for rotating shafts wherein the bearing will be free-floating and wherein metal to metal contact upon the thrust surfaces of the bearing is prevented by the interposition of a fluid medium under pressure.

An important purpose of the invention consists in providing a thrust bearing in accordance with the foregoing object, wherein a fluid pressure chamber shall be maintained within the bearing box for preventing surface to surface metallic contact between the thrust bearing thrust surface and the journal box; and wherein a constant circulation and flow of pressure fluid through the pressure chamber is maintained during operation of the thrust bearing.

Another important aim of the invention is to provide means for automatically maintaining a fluid medium under pressure between the thrust surfaces of a thrust bearing assembly, and wherein novel means are provided for removing any leakage of fluid past the bearing.

Yet another important purpose of the invention consists in providing a thrust bearing in conformity with the foregoing purposes, wherein a pair of fluid pressure chambers are provided on opposite sides of a thrust bearing of a rotatable shaft, together with mechanism for selectively varying the pressure imposed in the two fluid chambers, to thereby adjust the position of the thrust bearing in the journal box.

And a final object of the invention to be specifically enumerated herein resides in providing an apparatus according to the above mentioned objects, wherein novel and sensitive electrical means are provided for selectively adjusting the fluid pressures maintained in the two fluid pressure compartments of the thrust bearing, in accordance with variations in a predetermined position of the thrust bearing in its journal.

These, together with various ancillary objects of the invention, which will later become apparent, as the following description proceeds are attained by this device, preferred embodiments of which have been illustrated by way of example only in the accompanying drawings, wherein.

Referring now more specifically to the annexed drawings, wherein like numerals designate similar parts throughout the various views, 10 designates generally a rotatable shaft provided with thrust bearings in accordance with this invention for limiting and restraining axial movement of the shaft under varying loads imposed thereon during its rotation.

Figure 1:
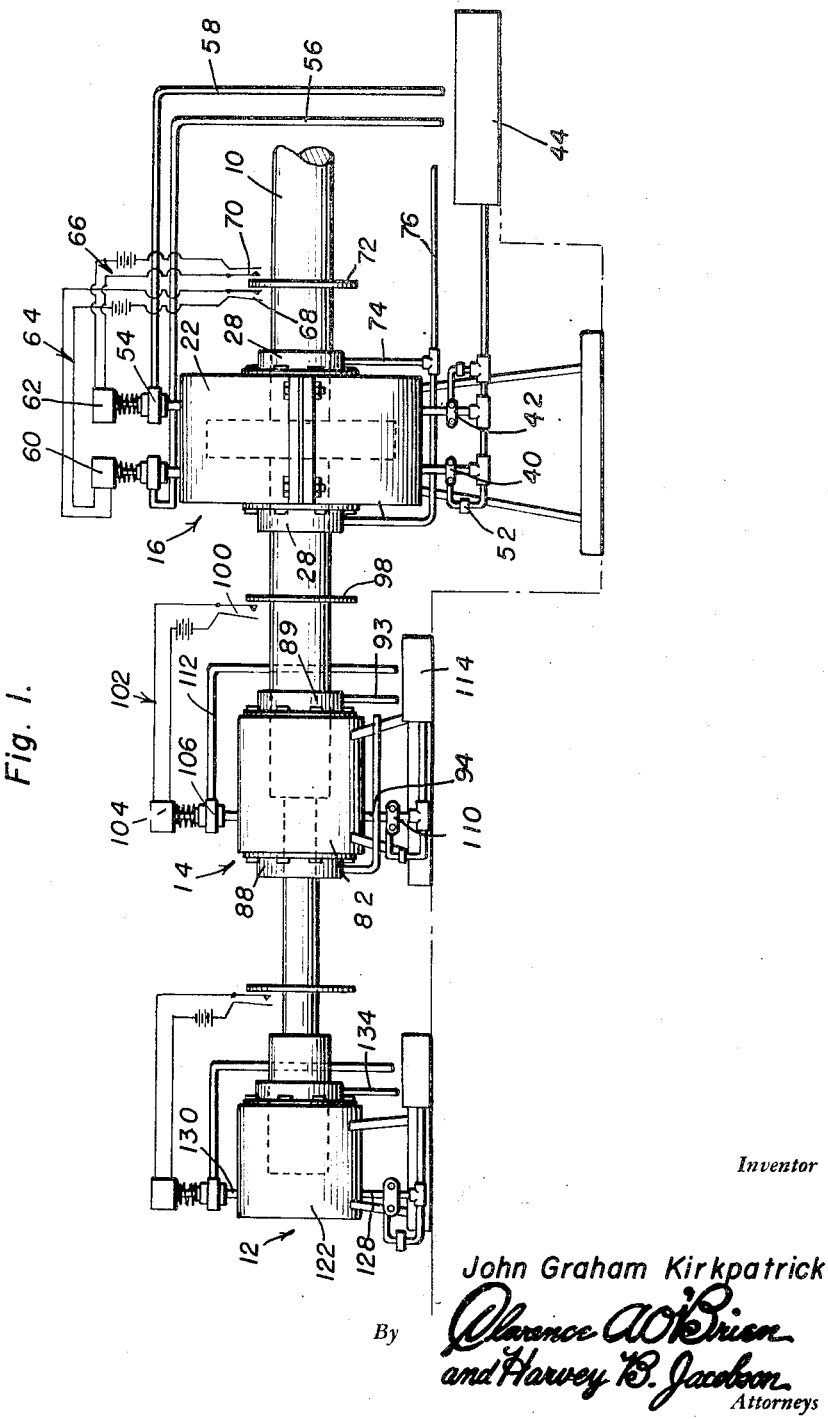
Figure 1 is a generally diagrammatic showing in side elevation indicating the manner of applying various embodiments of the device to the thrust bearings of a rotatable shaft.

As indicated in Figure 1, the shaft is provided with an end thrust bearing assembly indicated generally at 12, an intermediate thrust bearing assembly as at 14 and a further intermediate assembly as indicated at 16.

Figure 2:
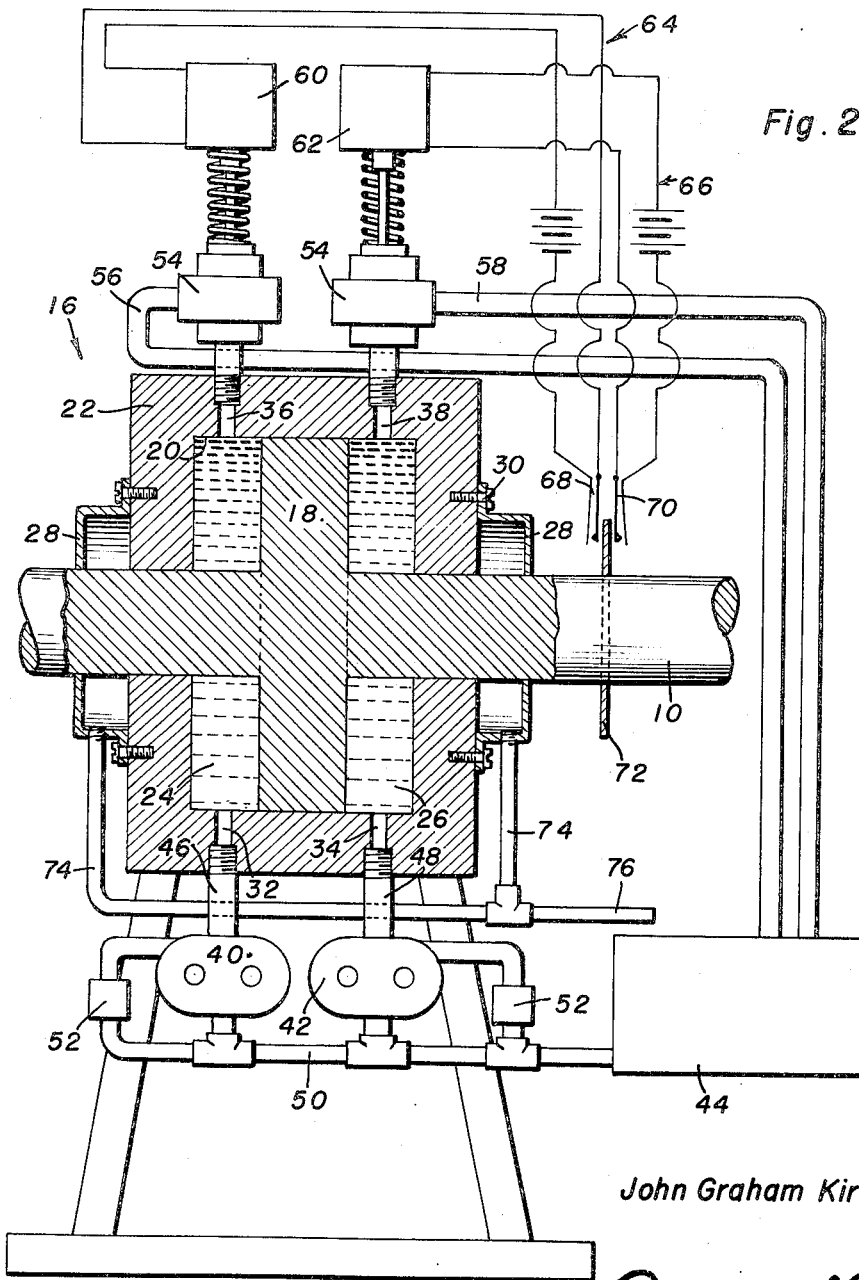
Figure 2 is an enlarged fragmentary view in longitudinal vertical section through the preferred form of thrust bearing in accordance with this invention and as shown at the right hand of Figure 1.

Reference is made first to Figure 2 which discloses the preferred embodiment of the thrust bearing. The rotatable shaft 10 is provided with an annular flange or shoulder 18 which snugly fits and is revoluble and slidable in a cylindrical bore 20 in a journal bearing casing 22. The enlarged portion 18 thus provides a pair of chambers 24 and 26 on opposite sides which chambers constitute thrust pressure chambers. The end walls of the casing 22 have secured thereto annular collecting members 28 detachably secured as at 30, which members have a tight fluid sealing engagement with the shaft 10 for collecting any fluid passing from the compartments 24 and 26 through the bore receiving the shaft 10. The fluid chambers or compartments 24 and 26 are provided with fluid inlet passages 32 and 34 and fluid outlet passages 36 and 38 respectively.

A pair of fluid pressure pumps 40 and 42 deliver fluid from a container or reservoir 44 by means of conduits 46 and 48 to the chambers or compartments 24 and 26 respectively.

The intake of each of the pumps 40 and 42 is connected to a delivery line 50 leading from the reservoir or container 44, and a pressure regulating or safety by-pass valve 52 is connected from the discharge side of the pumps to the delivery line 50. The outlet openings 36 and 38 are provided with spring opened valves 54 indicated generally in Figure 2, of any suitable construction and design, which valves are provided with outlet conduits 56 and 58 which discharge into the container or reservoir 44. The valves 54 of the compartments 24 and 26 are normally spring opened but are closed selectively by means of solenoids 60 and 62 respectively by means of electrical circuits indicated generally at 64 and 66, and which are controlled by switch means 68 and 70.

An annular disc 72 constituting a switch actuating means is suitably attached to the shaft 10 at any convenient point thereon, and if desired may be relatively actually adjustable thereon. This actuating means is disposed in proper position preferably between the two switches 68 and 70, so that when the shaft 10 is in its predetermined axial position neither switch will be actuated; but as the shaft is displaced either to the right or left as viewed in Figure 2, the actuating member 72 will selectively operate the switch 68 or 70 towards which the shaft is displaced.

The arrangement is such that when the thrust bearing 18 is in proper position in its journal bore 20, the actuator 72 is in neutral position and neither switch 68 or 70 is actuated. However, when a load varies upon the shaft 10 and the latter is displaced axially, the switch in the direction of displacement is actuated thereby closing the appropriate circuit 64 or 66, and energizing the solenoids 60 or 62 controlling the outlet of the chamber 24 or 26 into which the thrust bearing 18 has been forced. Obviously, upon closing of this outlet against the opposition of the opening spring of the valve, the corresponding fluid pressure pump 40 or 42 tends to build up a greater pressure in that chamber, thus preventing further inward movement of the thrust bearing therein, until such time as the rising pressure in that chamber forces the thrust bearing and the shaft 10 back into their predetermined position. This reverse movement of the shaft is permitted since the fluid pressure in the other chamber may escape through the appropriate spring opened valve 54.

During normal operation of the device, each chamber 24 and 26 has a constant flow of the fluid pressure medium therethrough, and a predetermined minimum pressure whereby the thrust bearing 18 is properly spaced and has no fluid contact with either end wall of these compartments. As will be seen, this form of thrust bearing is selectively responsible to an axial pressure in either direction, and promptly automatically tends to restore the thrust bearing to its normal intended position.

The collecting members 28 are connected by drainage or return conduits 74 with a return line 76 whereby any leakage fluid is returned to the reservoir 44 or if desired to the suction side of the pumps 40 and 42.

It should be here noted that it may be preferable to employ a single pump in place of the two pumps 40 and 42, this single pump delivering to each of the compartments 24 and 26 through its intake passage 32 and 34 respectively. However, it is necessary to provide separate outlets from these compartments in order to control the pressure maintained therein, and to vary this pressure in accordance with the automatic actuating means above described.

As will be readily understood, the thrust bearing 18 in this form of the invention may be disposed at any suitable point throughout the length of the shaft 10. It may if desired be brought integral with the shaft or separately and adjustably attached thereto, and if desired may have a suitable sealing means between its outer circumference and the inner circumference of the bore 20 in which it rotates and slides, in order to minimize leakage of pressure fluid between the chambers 24 and 26.

It is contemplated that any suitable pressure fluid may be employed in this device, and while a hydraulic fluid such as oil is extremely satisfactory, the invention may also be applied to the use of gaseous fluids. It is also contemplated that the discharge valves 54, whose construction forms no part of the invention in itself, may be adapted to maintain a predetermined and regulable pressure within the fluid pressure compartments.

Figure 3:
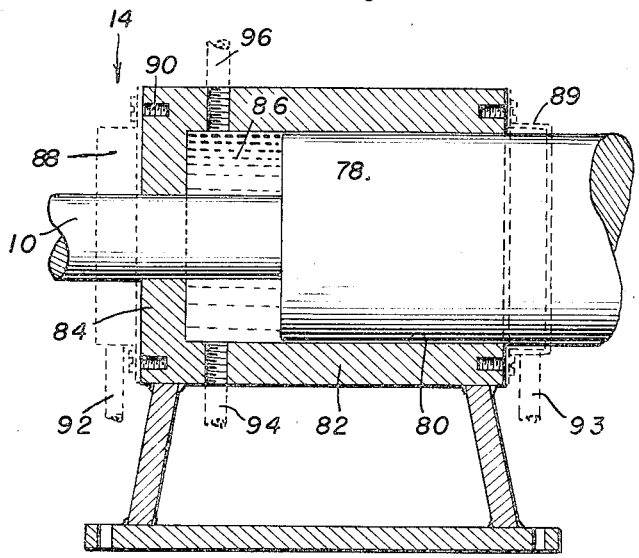
Figure 3 is an enlarged fragmentary view in vertical longitudinal section through a second construction of the thrust bearing in accordance with this invention, the attachment being shown at the middle of Figure 1; and, Figure 4 is an enlarged fragmentary view in vertical longitudinal section of a third embodiment of the invention as shown at the left of Figure 1.

Attention is next directed to the form of the invention as shown in Figure 3, wherein there is disclosed a form of thrust bearing which is self adjusting and resists thrusts applied from one direction only. This form of the invention may be applied in installations by itself, or in conjunction with the form previously described.

In this embodiment, which is likewise intended for use intermediate the ends of a shaft, a rotatable and axially displaceable shaft 10 is provided with a cylindrical enlarged portion 78, which is rotatable and slidable in a cylindrical bore 80 formed in a journal bearing box 82 having an end wall 84. A fluid pressure chamber 86 is thus formed between the end wall 84 and the adjacent inner surface of the enlarged portion 78 of the shaft 10. The shaft 10 is rotatably and slidably journaled in the end wall 84, and as in the preceding embodiment is surrounded by an annular fluid leakage collecting chamber 88 detachably secured as at 90, while the other extremity of the bearing box 82 is provided with a similar collecting member 89 having a leakage and return line 93. Each of the collecting chambers 88 and 89 is provided with a fluid tight sealing engagement with the rotatable shaft 10 and enlargement 78 thereof respectively. The fluid pressure chamber 86 is provided with a fluid pressure inlet conduit 94 and an outlet conduit 96 respectively. It is, of course, understood that these conduits have associated therewith the same fluid pressure supplying and valving means whose construction has been set forth in the preceding embodiment. However, as shown in Figure 1, the thrust bearing 14 is provided with a control means which is somewhat simplified although of the same principle as that set forth in the preceding embodiment. For this purpose, the shaft 10 is provided with an annular actuating plate or disc 98 which if desired may be longitudinally adjustable thereon, and which in response to a predetermined movement of the shaft 10 towards the left, will actuate the switch 100 controlling the circuit 102 for activating the solenoid 104 of the discharge valve 106. In this form of the invention, when the shaft is in its predetermined axial position, the actuating member 98 releases the switch 100, and the control valve 106 is therefore normally spring opened whereby fluid can flow from the pump means 110 and the inlet conduit 94 into the fluid pressure thrust chamber 86 and under the control of the discharge valve 106, may escape therefrom and be returned by a line 112 to the fluid pressure reservoir or container 114 from whence the pump draws its supply. Thus, a circulation of pressure fluid through the thrust chamber is maintained at a minimum fluid pressure, which prevents metal to metal contact of the enlargement 78 with the end wall 84 of the thrust bearing assembly. However, when the shaft 10 is moved to the left in response to a varying load applied thereto, the actuator 98 after a predetermined position has been attained, closes the switch 100, whereby the solenoid 104 closes the valve 106 preventing escape of fluid from the compartment 86 and thus stopping further axial displacement of the shaft 10. As the pressure is built up in the chamber 86 by the pump 110, the rising pressure gradually forces the enlargement 78 of the thrust bearing back to its original predetermined position, at which point the actuator 98 releases the switch 100 whereby the system is restored to its official position.

Obviously, any suitable means may be provided, such as a similar thrust bearing to that just described at the other end of the shaft 10, or the mechanism indicated at 16 may be employed, or if desired resilient means may be provided for biasing the shaft 10 inwardly or the left as viewed in Figure 1.

Figure 4:
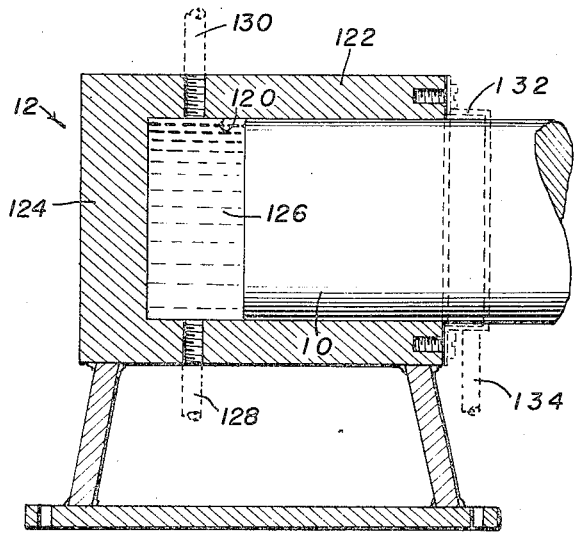

A more simplified embodiment may be employed as a thrust bearing and even as a terminal of a rotatable shaft. Such a construction is indicated at 12 and shown best in Figure 4. In this form, a terminal of the shaft 10, either enlarged in diameter or not as preferred, is rotatably and slidably received in the cylindrical bore 120 of a tubular journal bearing block or casing 122 having a closed end wall 124. A fluid pressure thrust chamber 126 is thus provided between the end wall 124 and the outer end surface of the shaft 10. Fluid pressure inlet and outlet conduit means 128 and 130 respectively are provided for the chamber 126, and the same control mechanism described with regard to the preceding embodiment may be utilized therewith. Similarly, a collecting chamber 132 may be detachably secured to the open end of the tubular journal 122, whereby fluid leaking by the shaft may be collected and returned by a conduit 134.

The actuating means and operation of this third embodiment is identical with that of the second embodiment, although the bearing structure is slightly different.

It will be apparent that the principles of this invention lend themselves to many modifications and adaptations, depending upon the environment in which the thrust bearing is to be employed. Thus, it would be possible to employ a single fluid pressure producing means for supplying pressure to a plurality of thrust bearings of any desired type, it merely being necessary to have individual outlet valves selectively controlled in order to secure the desired compensating movement of the thrust bearing.

Since numerous modifications will readily occur to those skilled in the art, it is not desired to limit the invention to the exact construction shown and described, but all suitable modifications and equivalents may be resorted to falling within the scope of the appended claims.

Having described the invention, what is claimed as new is:

1. A self adjusting thrust bearing for rotating shafts comprising a bearing box having a chamber, a shaft rotatably and slidably journaled in said bearing box, an enlargement on said shaft in said chamber, the periphery of said enlargement rotatably and slidably engaging continuously the walls thereof and forming a compartment between said chamber and said enlargement, and means for maintaining fluid pressure in said compartment opposing movement of said enlargement into said compartment.

2. The combination of claim 1 including a pump for maintaining a predetermined fluid pressure in said compartment.

3. The combination of claim 2 including controllable outlet means for maintaining a circulation of fluid through said compartment.

4. A self adjusting thrust bearing for rotating shafts comprising a bearing box having a chamber, a shaft rotatably and slidably journaled in said bearing box, an enlargement on said shaft in said chamber rotatably and slidably engaging the walls thereof and forming a compartment between said chamber and said enlargement, and means for maintaining fluid pressure in said compartment opposing movement of said enlargement into said compartment, said means including a pump for maintaining fluid pressure in said compartment, outlet means for maintaining a circulation of fluid through said compartment, a valve controlling said outlet, resilient means biasing said valve to its open position and means responsive to predetermined sliding movement of said shaft into said chamber for closing said valve.

5. The combination of claim 4, said last named means including an actuating member on said shaft, an actuated member operable by said actuating member after a predetermined displacement of said shaft and mechanism connecting said actuated member to said valve.

6. The combination of claim 5 wherein said mechanism includes a solenoid connected with said valve, an electrical circuit, and a switch controlling said circuit and comprising said actuated member.

7. An anti-friction free-floating thrust bearing construction for rotating shafts having a bearing box comprising an enlargement on a shaft slidably and rotatably journaled in said bearing box, the periphery of said enlargement being slidable in and having a continuous fluid-tight engagement with the interior wall of a compartment in said box, means including a pump for causing a circulation of pressure fluid through said compartment and maintaining a predetermined fluid pressure therein, a fluid collecting chamber surrounding said shaft exteriorly of said box for collecting fluid leakage about said shaft, and return means connecting said collecting chamber with said means.

8. In combination, a journal box having a chamber therein, a shaft rotatably and slidably journaled in said thrust box and having an annular enlargement, said enlargement being peripherally and slidably engageable with the interior wall of said chamber and defining with the walls of said chamber a pair of compartments on opposite sides of said enlargement, means for constantly supplying pressure fluid to each compartment for opposing movement of said enlargement therein, and means for selectively increasing the pressure in that compartment into which the enlargement is introduced in response to axial movement of said shaft.

9. The combination of claim 8 including means for releasing said increased pressure in response to return of said shaft to its predetermined position.

10. A self-adjusting thrust bearing for rotating shafts comprising a bearing box, a chamber therein and an end wall therefor, a shaft rotatably and slidably journaled in said end wall and extending into said chamber, a movable partition having a fluid-tight engagement with the interior wall of said chamber and fixed to said shaft, said partition and end wall defining with the interior wall of said chamber an expansible compartment in said bearing block, means for introducing pressure fluid into said compartment for maintaining a fluid pressure against said partition for opposing movement of the latter towards said end wall.

11. The combination of claim 10, including pressure fluid outlet means for said compartment, valve means controlling said outlet means and actuating means for operating said valve means.

12. The combination of claim 10, including a pressure fluid outlet passage for said compartment and means responsive to predetermined axial movement of said shaft relative to said chamber for controlling flow through said outlet passage and from said compartment.

13. The combination of claim 8, wherein said last-named means includes a valve movable to open and closed position, resilient means urging said valve to one of said positions and actuating means moving said valve to the other position.

14. The combination of claim 8, wherein said last-named means includes a valve movable to open and closed position, resilient means urging said valve to one of said positions and actuating means moving said valve to the other position, said actuating means comprising a solenoid operable in response to predetermined axial movement of said shaft.

JOHN GRAHAM KIRKPATRICK.

REFERENCES CITED

The following references are of record in the file of this patent:

UNITED STATES PATENTS

| Number | Name | Date |
|---|---|---|
| 594,462 | Cook | Nov. 30, 1897 |
| 846,927 | Lasche | Mar. 12, 1907 |
| 974,192 | Sawin | Nov. 1, 1910 |
| 1,421,785 | Junggren | July 4, 1922 |
| 2,070,115 | Crane | Feb. 9, 1937 |